United States Patent
Baughman et al.

(10) Patent No.: US 11,308,285 B2
(45) Date of Patent: Apr. 19, 2022

(54) TRIANGULATED NATURAL LANGUAGE DECODING FROM FORECASTED DEEP SEMANTIC REPRESENTATIONS

(71) Applicant: International Business Machines Corporation, Armonk, NY (US)

(72) Inventors: Aaron K. Baughman, Cary, NC (US); Micah Forster, Round Rock, TX (US); John C. Newell, Austin, TX (US); Stephen C. Hammer, Marietta, GA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 277 days.

(21) Appl. No.: 16/670,773

(22) Filed: Oct. 31, 2019

(65) Prior Publication Data
US 2021/0133288 A1    May 6, 2021

(51) Int. Cl.
*G06F 17/00*  (2019.01)
*G06F 40/30*  (2020.01)
*G06F 16/33*  (2019.01)
*G06F 40/295* (2020.01)

(52) U.S. Cl.
CPC .......... *G06F 40/30* (2020.01); *G06F 16/3347* (2019.01); *G06F 40/295* (2020.01)

(58) Field of Classification Search
None
See application file for complete search history.

(56) References Cited

U.S. PATENT DOCUMENTS

| | | | |
|---|---|---|---|
| 7,548,915 B2 | 6/2009 | Ramer et al. | |
| 7,593,605 B2 | 9/2009 | King et al. | |
| 7,812,860 B2 | 10/2010 | King et al. | |
| 10,248,718 B2 | 4/2019 | Podder et al. | |
| 10,810,472 B2 * | 10/2020 | Malak ................. | G06K 9/6217 |

(Continued)

FOREIGN PATENT DOCUMENTS

| | | |
|---|---|---|
| CN | 104516961 A | 4/2015 |
| EP | 3432155 A1 | 1/2019 |

OTHER PUBLICATIONS

Adi, Y., et al., "Analysis of sentence embedding models using prediction tasks in natural language processing," Jul./Sep. 2017, IBM J. Res. & Dev., vol. 61, No. 4/5, Paper 3, 9 pages.

(Continued)

*Primary Examiner* — Satwant K Singh
(74) *Attorney, Agent, or Firm* — Cantor Colburn LLP; Christopher Pignato

(57) ABSTRACT

Computer-implemented method includes developing, via a processor, a words model from a plurality of natural language text based articles relating to a subject and generating, via the processor, a static vector based upon the words model. The computer-implemented method further includes developing, via the processor, an actual articles model from actual articles, generating, via the processor, a bootstrapped vector using the actual articles model, generating, via the processor, a n-dimensional depth item using the static vector and the bootstrapped vector, and determining, via the processor, evidence based on the n-dimensional depth item. The computer-implemented method still further includes presenting, via the processor and a display, the evidence base upon an input query from a user.

18 Claims, 3 Drawing Sheets

(56) References Cited

U.S. PATENT DOCUMENTS

| | | | |
|---|---|---|---|
| 2017/0116178 A1 | 4/2017 | Kumar Rangarajan Sridhar | |
| 2017/0270193 A1 | 9/2017 | Misra et al. | |
| 2018/0341839 A1* | 11/2018 | Malak | G06V 30/2272 |
| 2018/0349352 A1 | 12/2018 | Mabbu | |
| 2020/0311205 A1* | 10/2020 | Büttner | G06F 40/216 |
| 2020/0349226 A1* | 11/2020 | Ristoski | G06N 3/08 |

OTHER PUBLICATIONS

Disclosed Anonymously, "Tools for Large-Scale Parser Development," Natural Language Processing Group, Microsoft Research, Redmond, WA (1 page).

Hori, C. et al., "Early and Late Integration of Audio Features for Automatic Video Description," Mitsubishi Electric Research Laboratories, Dec. 2017, TR2017-183, 9 pages.

Jung, S-Y, "Using Natural Language to Represent Knowledge in an Intelligent Tutoring System," Sep. 1-4, 2009, K-CAP, Intelligent Systems Program, University of Pittsburgh, Pittsburgh, Pennsylvania, USA, pp. 191-192.

Nascimento, J., et al., The Impact of Structured Event Embeddings on Scalable Stock Forecasting Models, Oct. 27-30, 2015, ACM, http://dx.doi.org/10.1145/2820426.2820467, 4 pages.

Šebek, M., "Mining Data Streams Approach for Text-Trend Analysis", Citeseer, 2010, 5 pages.

Zhang, C., et al., "Semantic Sentence Embeddings for Paraphrasing and Text Summarization," Sep. 26, 2018, Rochester Institute of Technology; Kodak Alaris Imaging Science R&D, Rochester, NY, 5 pages.

\* cited by examiner

TRIANGULATED NATURAL LANGUAGE DECODING FROM FORECASTED DEEP SEMANTIC REPRESENTATIONS

BACKGROUND

The present invention generally relates to component based forecasting, and more specifically, to triangulated natural language decoding from forecasted deep semantic representations.

Articles are read, understood and comprehended from a variety of publications, news sources, company information, etc. Once example of this is in the area of creating a forecast of a performance of a player in a sporting event for use in fantasy sports. Currently, in order for people to create forecasts of future events, they must obtain and read articles from a variety of different sources, Users increasingly want to know when a player is projected to boom, bust, play with an injury, play meaningful touches, projected score or get general player sentiment.

SUMMARY

Embodiments of the present invention are directed to triangulated natural language decoding from forecasted deep semantic representations. A non-limiting example computer-implemented method includes developing, via a processor, a words model from a plurality of natural language text based articles relating to a subject and generating, via the processor, a static vector based upon the words model. The computer-implemented method further includes developing, via the processor, an actual articles model from actual articles, generating, via the processor, a bootstrapped vector using the actual articles model, generating, via the processor, a n-dimensional depth item using the static vector and the bootstrapped vector, and determining, via the processor, evidence based on the n-dimensional depth item. The computer-implemented method still further includes presenting, via the processor and a display, the evidence base upon an input query from a user.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagrams, or the operations described therein without departing from the spirit of the invention. For instance, the actions can be performed in a differing order or actions can be added, deleted or modified. Also, the term "coupled", and variations thereof describes having a communications path between two elements and does not imply a direct connection between the elements with no intervening elements/connections between them. All of these variations are considered a part of the specification.

DETAILED DESCRIPTION

The invention provides a novel method for generating triangulated current and forecasted keywords, concepts and entities to retrieve supporting or refuting evidence. The method can be used in any natural language environment including and not limited to chat bots, human computer interaction and even robot to agent interaction.

Currently available databases include billions of articles that have been summarized into keywords or topics, these summarizations have very large datasets. In addition, the summarizations do not include any trends or forecasted states. With a static and extremely large set of keywords, retrieving supporting or refuting evidence is not precise. Instead, today, large scale evidence retrieval is recall oriented and provides many false positives. The evidence is not related to trending words over time.

One or more embodiments of the present invention provide a system and method to bootstrap an encoding over a topic. The topic could be about a football player, type of food or health condition. Each of the types of words or semantic meaning such as keywords, concepts and entities are projected into a word to vector description. The semantic values of the vectors are regressed over time to forecast each unit value within the vector to produce a forecasted vector. At the same time, the invention average the static vectors together. With three points (forecasted vector, static vector and bootstrapped vector), the invention can calculate the area of the triangle. The triangle with the lowest volume is considered the best evidence for a user's inquiry.

One or more embodiments of the present invention further provide a system and method to bootstrapped vector, to static and forecasted triangle side length, provide n-dimensional depth of the triangle based on semantic dimensions of evidence, and provide any semantic depth representation for volume estimation. In addition, other one or more embodiments of the present invention can forecast word encoding for each component and can combine volume of forecasted and static encoding among all n-dimensional planes.

Figure 1:
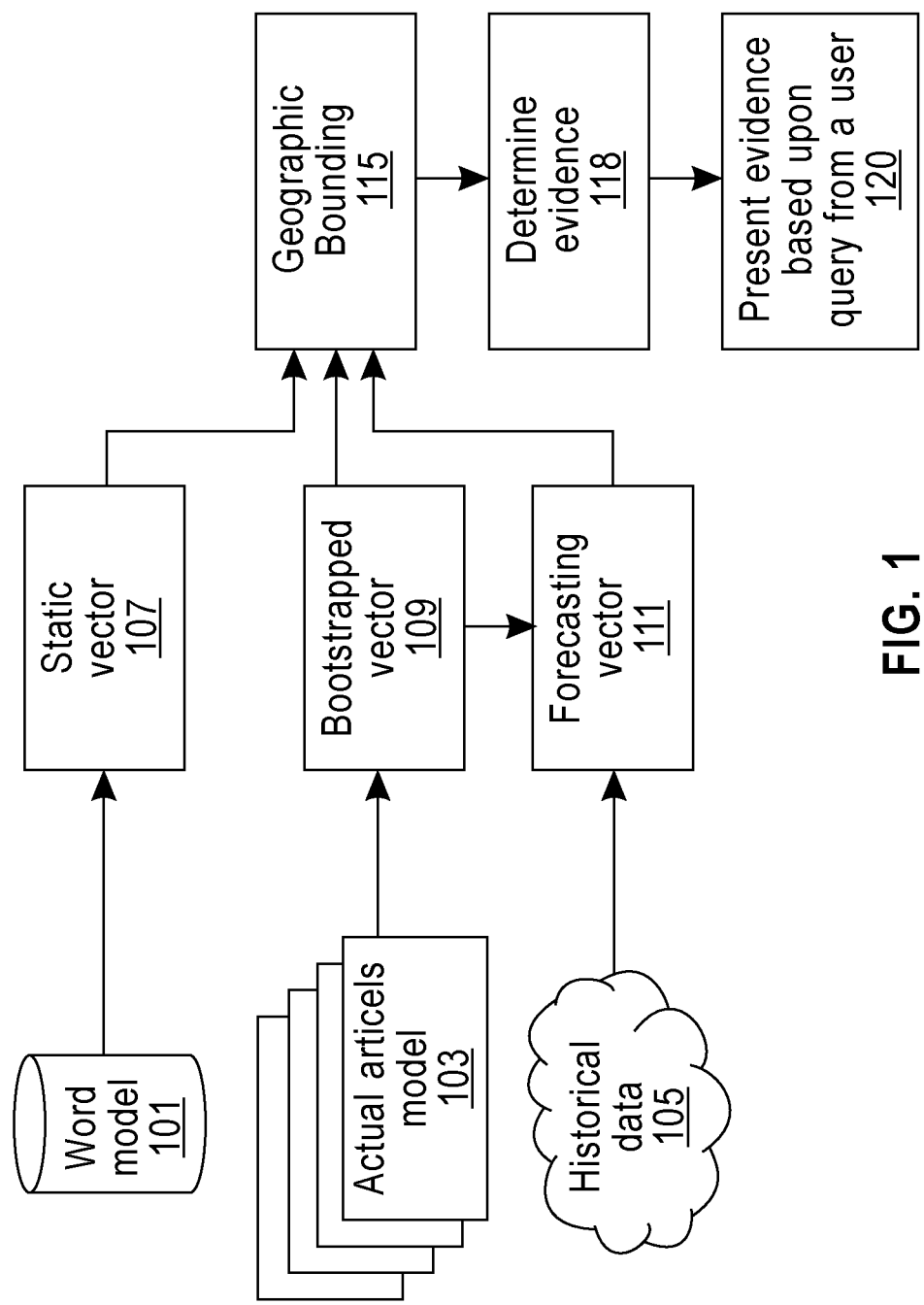
FIG. 1 illustrates a flow diagram of a process for triangulated natural language decoding from forecasted deep semantic representations in accordance with one or more embodiments of the present invention.

Turning now to FIG. 1, a flow diagram of a process for triangulated natural language decoding from forecasted deep semantic representations is generally shown in accordance with one or more embodiments of the present invention. The process creates a words model at block 101 and a static vector is created at block 107 using the words model. The process continues by developing an actual articles model at block 103 from actual articles then creates a bootstrapped vector at block 109. Continuing, a historical data model is created at block 105 and then a forecasting vector is created at block 111 using the historical data model. The process determines a geographical boundary at block 115 by using the static vector, the bootstrapped vector and the forecasting vector. Once the geographical boundary has been ascertained, evidence is determined at block 118. The process concludes by presenting the evidence based upon a query from a user at block 118.

Figure 2:
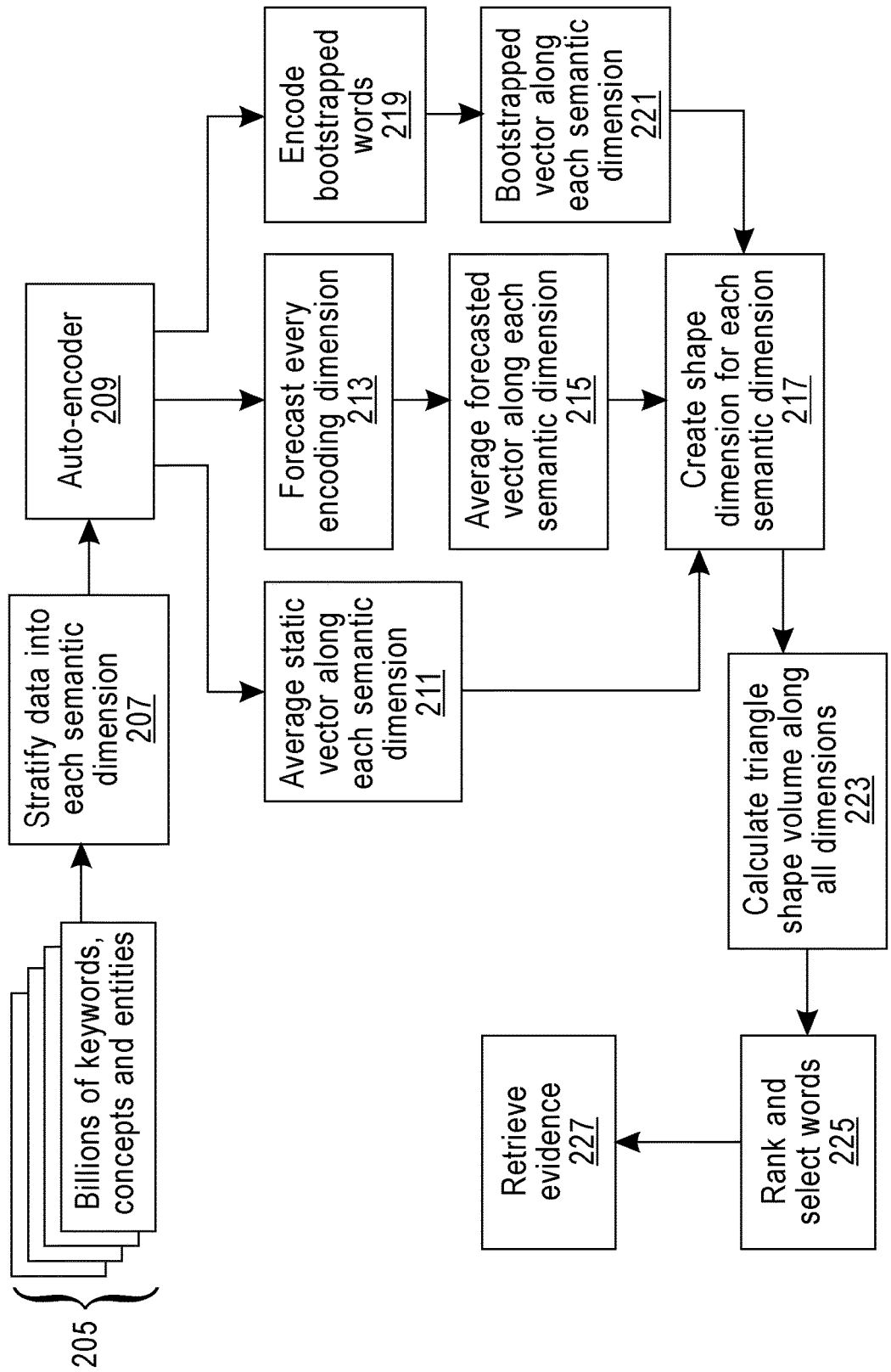
FIG. 2 illustrates another flow diagram of a process for triangulated natural language decoding from forecasted deep semantic representations in accordance with one or more embodiments of the present invention.

Turning now to FIG. 2, a flow diagram of another process for triangulated natural language decoding from forecasted deep semantic representations is generally shown in accordance with one or more embodiments of the present invention. The processing by accessing billions of keywords, concepts and entities at block 205. Accessing can be done by querying known databases or physically scanning the billions of keywords, concepts and entities. The data is stratified into each semantic dimension at block 207 and auto-encoded at block 209. The process continues by creating average static vector along each semantic dimension at block 211 by using the output the auto-encoder. Again, using an output of the auto-encoder, the process forecasts every encoding dimension at block 213 then creates an average forecasted vector along each semantic dimension at block 215. Still another output of the auto-encoding process is used to encode bootstrapped words at block 219. The process then creates bootstrapped vectors along each semantic dimension at block 221.

Still referring to FIG. 2, the process uses the static vector, the forecasted vector and the bootstrapped vectors to create a shape dimension for each semantic dimension at block 217. Once the shape dimension is created the process calculates the triangle volume along all of the dimensions at block 223 and then ranks and select words at block 225. The process then retrieves the evidence at block 227 base on an input query from a user.

It should be noted that dimension could be etymology or have a geolocation semantic meaning. For each dimension, every keyword, concept and entity is encoded into a large feature vector from a neural network encoder. For the index of semantic dimensions of evidence and type (entity, keyword or concept), every component of the feature vector is trended over time. The time component is organized over publication date. At the same time, the static components of semantic dimensions and type are averaged together. The bootstrap word is also encoded. At minimum, the invention will have three points to measure distance between vectors of each semantic dimension of evidence and type. The segment line length for each n-dimension is used to calculate a relative importance volume.

Each keyword, concept and entity is ranked based on the relative importance volume. The highest words are selected for evidence retrieval.

The following is one possible program for conducting triangulated natural language decoding from forecasted deep semantic representations in accordance with one or more embodiments of the present invention:

Weighting of Evidence Queries:

```
//query news discovery instance for specific player
query = "Antonio Brown, football"
query_results = discovery client.query(query)
//go through results and boost certain results that match the preferred source list
updated_boosted_query_results = [ ]
for result in query_results:
    //check if result link is in preferred list
    if result['link'] in preferred list:
        //boost document sentiment score
        result['sentiment'] = result['sentiment'] * boost_factor
        //boost number of entities
        result['entities'].extend(result['entities'] * boost_factor)
        updated_boosted_query_results.append(result)
    else:
        updated_boosted_query_results.append(result)
//fetch top results by relevance and boosted by
top_result = query_result.sort(key='relevance')[0 ]
//extract entities, concepts, keywords from top_result
let enriched_text = { }
enriched_text['entities'] = [ ]
enriched_text['concepts'] = [ ]
enriched_text['keywords'] = [ ]
for result in results:
    enriched_text['entities'].append(result['entities'])
    enriched_text['keywords'].append(result['keywords'])
    enriched_text['concepts'].append(result['concepts'])
//get feature vector for player name by query Document2Vector modeled using
(encyclopedia, and fantasy football data)
player_name = 'Antonio Brown'
player_feature_vector = Document2Vector.query(player_name)
//check vector is returned from document2vector if not then query using 'football'
if player_feature_vector.length <= 0:
    player_feature_vector = Document2Vector.query('football')
//iterate over all concepts, keywords, entities, returned by discovery top relevant result
(top_result) and generate feature_vectors and compare the feature_vector of the
enriched_text to the player_feature vector by measuring the Cartesian distance between
the two
concept_feature_vector = [ ]
keyword_feature_vector = [ ]
entity_feature_vector = [ ]
for concept in enriched_text['concepts']:
    //query Document2Vector with concept
    concept_feature_vector = Document2Vector.query(concept)
    //get distance between player name and concept
    concept_distance = Cartesian_distance(concept_feature_vector, player_feature_vector)
    concept_feature_vector.append({'concept': concept, 'distance': concept_distance })
```

-continued

Weighting of Evidence Queries:

```
for keyword in enriched_text['keywords']:
    //query Document2Vector with keyword
    keyword_feature_vector = Document2Vector.query(keyword)
    //get distance between player name and keyword
    keyword_distance = Cartesian_distance(keyword_feature_vector,
player_feature_vector)
    keyword_feature_vector.append({'keyword': keyword, 'distance': keyword_distance })
for entity in enriched_text['entities']:
    //query Document2Vector with entity
    entity_feature_vector = Document2Vector.query(entity)
    //get distance between player name and entity
    entity_distance = Cartesian_distance(entity_feature_vector, player_feature_vector)
    enity_feature_vector.append({'entity': entity, 'distance': entity_distance })
//sort concepts based on distance
sorted_concepts = sorted(concept_feature_vector, key = lambda concept:
concept['distance']
// sort keywords based on distance
sorted_keywords = sorted(keyword_feature_vector, key = lambda keyword:
keyword['distance']
//sort entities based on distance
sorted_concepts = sorted(entity_feature_vector, key = lambda entity: entity['distance']
top_concepts = [ ]
top_keywords = [ ]
top_entities = [ ]
for concept in sorted_concepts:
    top_concepts. append(concept['concept'])
for keyword in sorted_keywords:
    top_keywords.append(keyword['keyword'])
for entity in sorted_entites:
    top_entities.append(entity['entity'])
//get top 10 concepts, entities, keywords with shortest distance to player feature vector
top_concepts = top_concepts[:10]
top_keywords = top_keywords[:10]
top_entities = top_entities[:10]
//merge all lists into one array for concepts, keywords, entities
top_enriched_text = [ ]
top_enriched_text.extend(top_concepts)
top_enriched_text.extend(top_keywords)
top_enriched_text.extend(top_entities)
//get boom/bust result from AI Pipeline
boomBustResult = AIPipeline.getResult( )
//join boom/bust result with top_enriched_text as a comma separated array
top_enriched_text.append(boomBustResult)
relevance_query = ', '.join(top_enriched_text)
```

Figure 3:
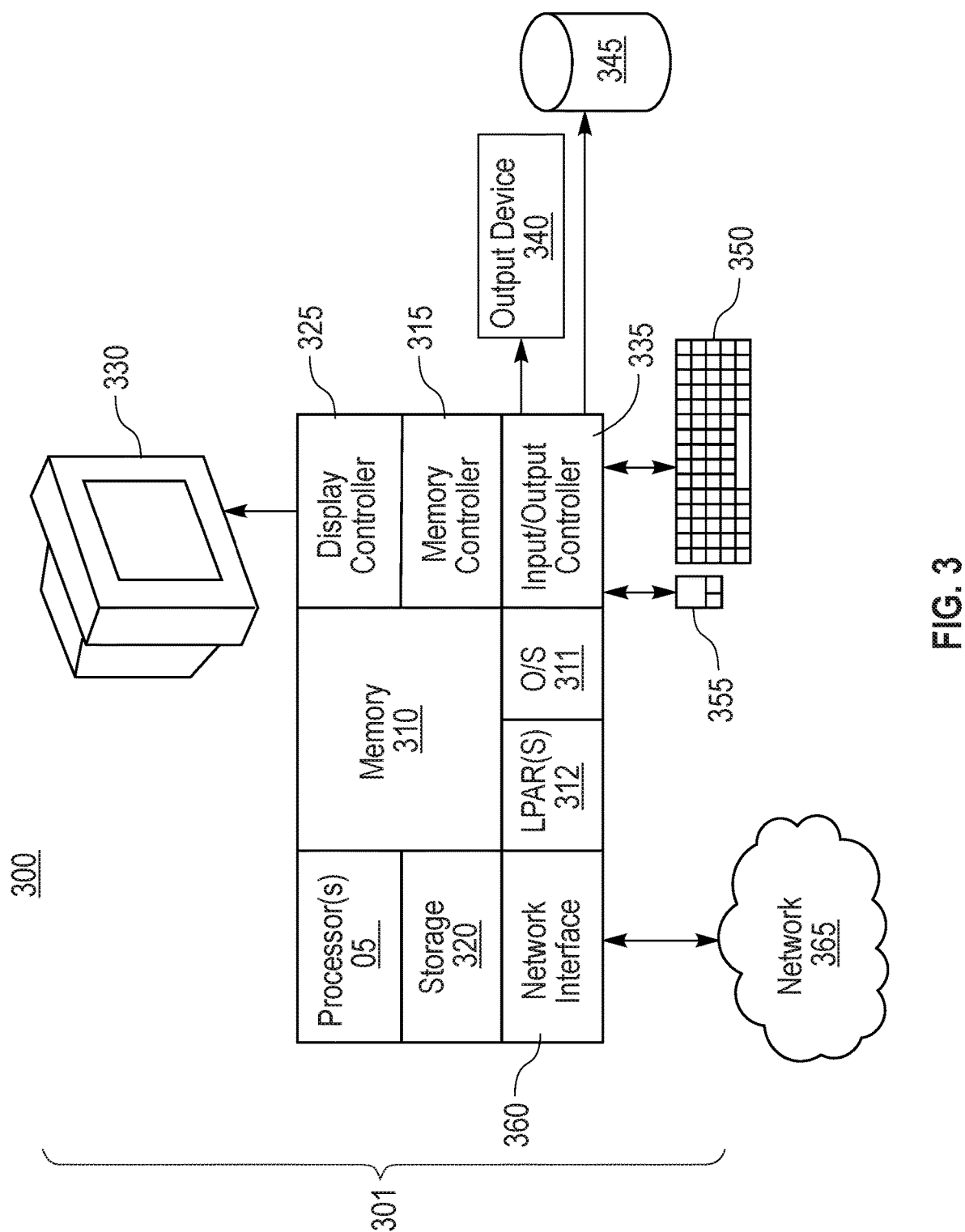
FIG. 3 illustrates a computer system to implement the triangulated natural language decoding from forecasted deep semantic representations in accordance with one or more embodiments of the present invention.

Turning now to FIG. 3, a computer system 300 for determining data placement on storage devices is generally shown in accordance with one or more embodiments of the present invention. The methods described herein can be implemented in hardware, software (e.g., firmware), or a combination thereof. In an exemplary embodiment, the methods described herein are implemented in hardware as part of the microprocessor of a special or general-purpose digital computer, such as a personal computer, workstation, minicomputer, or mainframe computer. The system 300 therefore may include general-purpose computer or mainframe 301 capable of running multiple instances of an O/S simultaneously.

In an exemplary embodiment, in terms of hardware architecture, as shown in FIG. 3, the computer 301 includes one or more processors 305, memory 310 coupled to a memory controller 315, and one or more input and/or output (I/O) devices 340, 345 (or peripherals) that are communicatively coupled via a local input/output controller 335. The input/output controller 335 can be, for example but not limited to, one or more buses or other wired or wireless connections, as is known in the art. The input/output controller 335 may have additional elements, which are omitted for simplicity, such as controllers, buffers (caches), drivers, repeaters, and receivers, to enable communications. Further, the local interface may include address, control, and/or data connections to enable appropriate communications among the aforementioned components. The input/output controller 335 may include a plurality of sub-channels configured to access the output devices 340 and 345. The sub-channels may include fiber-optic communications ports.

The processor 305 is a hardware device for executing software, particularly that stored in storage 320, such as cache storage, or memory 310. The processor 305 can be any custom made or commercially available processor, a central processing unit (CPU), an auxiliary processor among several processors associated with the computer 301, a semiconductor based microprocessor (in the form of a microchip or chip set), a macroprocessor, or generally any device for executing instructions.

The memory 310 can include any one or combination of volatile memory elements (e.g., random access memory (RAM, such as DRAM, SRAM, SDRAM, etc.)) and non-volatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 310 may incorporate electronic, magnetic, optical, and/or other types of storage media. Note that the memory 310 can have a distributed architecture, where various components are situated remote from one another, but can be accessed by the processor 305.

The instructions in memory 310 may include one or more separate programs, each of which comprises an ordered listing of executable instructions for implementing logical functions. In the example of FIG. 3, the instructions in the memory 310 a suitable operating system (OS) 311. The operating system 311 essentially controls the execution of other computer programs and provides scheduling, input-output control, file and data management, memory management, and communication control and related services.

The memory 310 may include multiple logical partitions (LPARs) 312, each running an instance of an operating system. The LPARs 312 may be managed by a hypervisor, which may be a program stored in memory 310 and executed by the processor 305.

In an exemplary embodiment, a conventional keyboard 350 and mouse 355 can be coupled to the input/output controller 335. Other output devices such as the I/O devices 340, 345 may include input devices, for example but not limited to a printer, a scanner, microphone, and the like. Finally, the I/O devices 340, 345 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 300 can further include a display controller 325 coupled to a display 330. In an exemplary embodiment, the system 300 can further include a network interface 360 for coupling to a network 365. The network 365 can be an IP-based network for communication between the computer 301 and any external server, client and the like via a broadband connection. The network 365 transmits and receives data between the computer 301 and external systems. In an exemplary embodiment, network 365 can be a managed IP network administered by a service provider. The network 365 may be implemented in a wireless fashion, e.g., using wireless protocols and technologies, such as WiFi, WiMax, etc. The network 365 can also be a packet-switched network such as a local area network, wide area network, metropolitan area network, Internet network, or other similar type of network environment. The network 365 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 301 is a PC, workstation, intelligent device or the like, the instructions in the memory 310 may further include a basic input output system (BIOS) (omitted for simplicity). The BIOS is a set of essential software routines that initialize and test hardware at startup, start the OS 311, and support the transfer of data among the hardware devices. The BIOS is stored in ROM so that the BIOS can be executed when the computer 301 is activated.

When the computer 301 is in operation, the processor 305 is configured to execute instructions stored within the memory 310, to communicate data to and from the memory 310, and to generally control operations of the computer 301 pursuant to the instructions.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
developing, via a processor, a words model from a plurality of natural language text based articles relating to a subject;
generating, via the processor, a static vector based upon the words model;
developing, via the processor, an actual articles model from actual articles;
generating, via the processor, a bootstrapped vector using the actual articles model;
generating, via the processor, a n-dimensional depth item using the static vector and the bootstrapped vector;
determining, via the processor, evidence based on the n-dimensional depth item;
generating, via the processor, a forecast vector based upon historical articles; and
presenting, via the processor and a display, the evidence base upon an input query from a user.

2. The computer-implemented method according to claim 1, further comprising modifying, via the processor, the n-dimensional depth item using the forecast vector.

3. The computer-implemented method according to claim 1, wherein the presented evidence determines how keywords are trending over time.

4. The computer-implemented method according to claim 1, wherein the n-dimensional depth item forms a geographic boundary.

5. The computer-implemented method according to claim 4, further comprising generating, via the processor, a forecast vector based upon historical articles.

6. The computer-implemented method according to claim 5, wherein the forecast vector, the static vector and the bootstrapped vector form a triangle area, such that a lowest triangle area produces better evidence for the user.

7. The computer-implemented method according to claim 1, wherein the presented evidence determines how concepts are trending over time.

8. The computer-implemented method according to claim 1, wherein the presented evidence determines how entities are trending over time.

9. A system comprising:
a memory having computer readable instructions; and
one or more processors for executing the computer readable instructions, the computer readable instructions controlling the one or more processors to perform operations comprising:
developing a words model from a plurality of natural language text based articles relating to a subject;
generating a static vector based upon the words model;
developing an actual articles model from actual articles;
generating a bootstrapped vector using the actual articles model;
generating a n-dimensional depth item using the static vector and the bootstrapped vector;
determining evidence based on the n-dimensional depth item;
generating a forecast vector based upon historical articles; and
presenting, via a display, the evidence base upon an input query from a user.

10. The system according to claim 9, further comprising modifying the n-dimensional depth item using the forecast vector.

11. The system according to claim 9, wherein the presented evidence determines how keywords are trending over time.

12. The system according to claim 9, wherein the n-dimensional depth item forms a geographic boundary.

13. The system according to claim 12, further comprising generating a forecast vector based upon historical articles.

14. The system according to claim 13, wherein the forecast vector, the static vector and the bootstrapped vector form a triangle area, such that a lowest triangle area produces better evidence for the user.

15. The system according to claim 9, wherein the presented evidence determines how concepts are trending over time.

16. The system according to claim 9, wherein the presented evidence determines how entities are trending over time.

17. A computer program product comprising a computer readable storage medium having program instructions embodied therewith, the program instructions executable by a processor to cause the processor to perform operations comprising:
developing a words model from a plurality of natural language text based articles relating to a subject;
generating a static vector based upon the words model;
developing an actual articles model from actual articles;
generating a bootstrapped vector using the actual articles model;

generating a n-dimensional depth item using the static vector and the bootstrapped vector;

determining evidence based on the n-dimensional depth item;

generating a forecast vector based upon historical articles; and presenting, via a display, the evidence base upon an input query from a user.

18. The computer program product according to claim 17, wherein the n-dimensional depth item forms a geographic boundary and the forecast vector, the static vector and the bootstrapped vector form a triangle area, such that a lowest triangle area produces better evidence for the user.

* * * * *